431-160 SR
1/5/87 OR H 000,195

United States Statutory Invention Registration [19]

[11] Reg. Number: H195
[43] Published: Jan. 6, 1987

DeWilde

[54] RESEARCH BURNER

[75] Inventor: Mark A. DeWilde, Bel Air, Md.

[73] Assignee: The United States of America as represented by the Secretary of the Army, Washington, D.C.

[21] Appl. No.: 662,932

[22] Filed: Oct. 18, 1984

[51] Int. Cl.[4] ..... F23D 11/36
[52] U.S. Cl. ..... 431/160; 431/278; 431/328
[58] Field of Search ..... 431/160, 278, 284, 326, 431/328, 356; 239/128, 132, 132.1, 132.3, 418, 424, 425, 427.3

[56] References Cited

U.S. PATENT DOCUMENTS

| | | | |
|---|---|---|---|
| 2,075,278 | 3/1937 | Hageman | 431/328 |
| 2,528,738 | 1/1950 | Calkins et al. | 431/328 |
| 2,961,859 | 11/1960 | Joy | 431/328 |
| 2,990,749 | 7/1961 | Thiers et al. | 431/284 |
| 3,137,995 | 6/1964 | Othmer et al. | 239/132.3 |
| 3,149,613 | 9/1964 | Anschutz | 431/160 |
| 3,511,587 | 5/1970 | Jansen et al. | 431/160 |
| 3,531,229 | 9/1970 | Berglund | 431/328 |
| 3,635,651 | 1/1972 | Desty | 431/328 |
| 3,947,233 | 3/1976 | Sundberg | 431/326 |
| 4,443,228 | 4/1984 | Schlinger | 239/132.3 |

FOREIGN PATENT DOCUMENTS

| | | | |
|---|---|---|---|
| 378723 | 8/1932 | United Kingdom | 239/132.3 |

*Primary Examiner*—Harold J. Tudor
*Attorney, Agent, or Firm*—Anthony Lane; Robert Gibson; Edward F. Costigan

[57] ABSTRACT

A research burner having a water-cooled hemispherical head provided with a curved upper surface adapted as a seat for a flame which is surrounded by a shroud of inert gas. The burner provides for optical access to the various zones of the flame under study for both temperature and concentration of species in a compatible mixture.

1 Claim, 1 Drawing Figure

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

RESEARCH BURNER

GOVERNMENTAL INTEREST

The invention described herein may be manufactured, used and licensed by or for the Government for Governmental purposes without payment to me of any royalties thereon.

FIELD OF USE

This invention relates to an improved burner for use in research.

More particularly, this invention relates to an improved research burner which allows optical access to the pre-combustion and primary reaction zones of flames of combustible mixtures.

PRIOR ART

The study of the reaction chemistry of flames centers on the thin primary reaction zone which is typically on the order of 100 μm thick for a nearstoichiometric flame at atmospheric pressure.

Traditional burners for studying these systems are made by using an array of tubes or the equivalent, sintered porous metal disks, a metal screen or plate, or some other physical barriers to establish a stable flame. Any of these systems result in the extraction of heat from the flame with the amount dependent upon several physical parameters.

In a typical configuration, a stable flame requires that the primary reaction zone by seated very near the burner surface. The latter position makes access to the zone quite difficult at atmospheric pressures. The use of a low pressure chamber to expand the flame zones has been used frequently.

The primary cause of the above difficulty lies in the large index of refraction changes due to temperature and composition differences at the interface between the ambient air and the high temperature flame gases. A laser beam entering the flame is deflected downward into the flame burner surface due to the index of refraction changes at the interface. This causes extensive light scattering which obscures any observation of produced signals such as fluoresence or Raman spactra. In intracavity work with CW lasers, the hitting of the surface makes impossible any probing of the flame lower than that distance which allows the beam to pass completely through the flame.

An alternative burner of the art has shown usefulness in probing these low-lying zones but suffers from severe flash-back problems when high flame speed mixtures are used. As a result, such device cannnot be used for these mixtures without excessive dilution of the mixture with an inert gas.

SUMMARY OF INVENTION

It is therefore an object of this invention to provide an improved research burner which allow optical access to the primay combustion regions of flames for research purposes.

A further object is to provide an improved research burner which can produce stable flames of flammable gas mixtures, and which allow optical access to the primary reaction zones.

Other objects and many of the attendant advantages of this invention will become more apparent from a detailed reading of this application when taken with the accompanying drawing, wherein:

FIG. 1 is a full cross-sectional exploded view of the burner of this invention.

DETAILED DESCRIPTION

Figure 1:
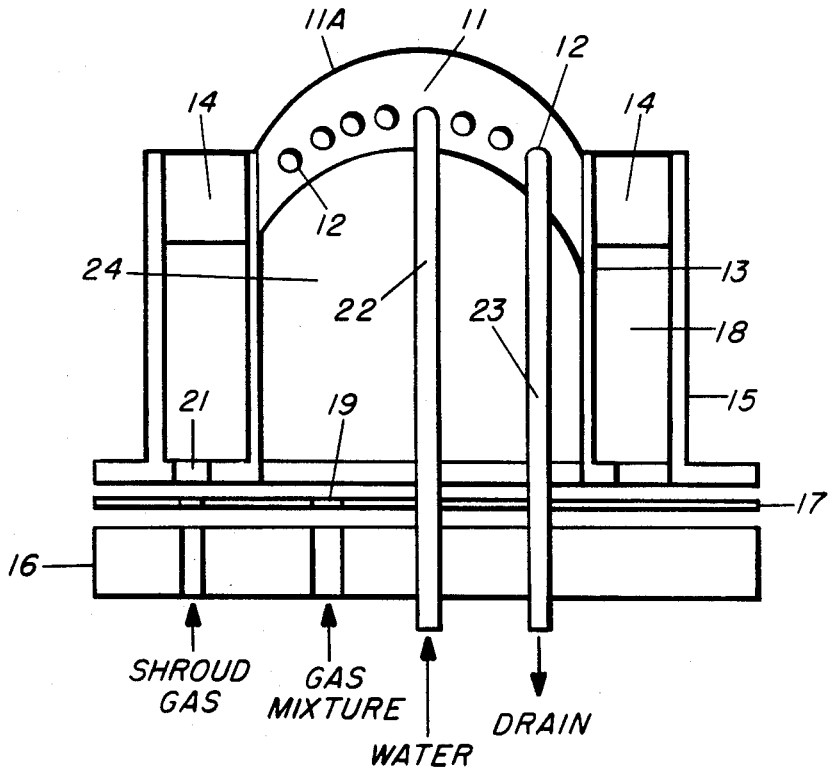

In general, this invention is a research burner for use with premixed combustible gases. Referring to the FIGURE, the major functional element is a hemispherical center block 11 made of porous sintered metal such as bronze. The top 11A is made with curvature, typically a two-inch radius of curvature serving as a surface for optical access. The hemispherical block 11 is fitted with an internal water-cooling coil 12. The latter coil spirals in the block 11 to carry away the heat that is transferred to the block from the flame. A thin metal septum or shell 13 is affixed to a base 16 and confines the combustible gas mixture to the space below the block 11. An annulus 14 of porous sintered metal such as bronze is provided with a flow of inert gas, and this passes through the metal annulus itself to provide a shroud of gas around the flame, the latter being produced on the upper surface 11A of the head or black 11. The outer shell 15 surrounds the entire assembly and is engaged to the bottom plate 16 and is sealed with a teflon gasket 17.

More specifically, the burner is provided with a base or plate 16, and a septum or shell 13 of hollow construction is secured to the latter base 16. A hemispherical head or block 11 is secured to the open-end of the septum or first shell 13 in a fashion such that the curvature of the block rises above the end of the septum or first shell 13. The upper surface of the head or block 11A provides the base of the flame under study. A metallic outer shell 15 is also secured to the base in spaced relation to the septum a first shell 13 forming a channel 18. An annulus 14 of porous metal is mounted between the upper end of the spectum or first shell and the free end of the second shell 15. The base 16 is provided with an inlet 19 for the combustible gas mixture which communicates with the confined area formed or bounded by the first shell or septum 13 and the hemispherical head or block 11. A second inlet 21 is provided in the base 16 for a shroud gas in communicating relationship to the channel formed by the septum and the second shell 15 in flow relationship to the bottom surface of the annulus of porous metal. This provides, in operation, a shroud of gas around the flame on the upper surface 11A of the head or block 11. A heat-dissipating effect is provided to the head a block 11 by a spiralling coil of copper tubing 12 having an inlet 22 and outlet 23 for the provision of water. The base 16 is adapted to receive the latter inlet and outlet of water.

In operation, water is introduced into the inlet 22 of the base 16, the water flowing in an upwardly fashion to an through the spiraling coil 11 of copper tubing in the hemispherical head or block 11 to the outlet and thence downwardly away from the burner. This flow through the block 11 has a heat-dissipating effect on the block when the combustible mixture is ignited to provide a flame on the upper surface 11A of the hemispherical head or block 11. At this stage, a shroud of gas is introduced through the inlet port 21 of the base 16 to the channel formed by the inner and outer metallic shells 13 and 15 in communicating relationship to the porous annulus 14. The inert gaseous shroud may be argon, nitrogen or helium, and when introduced to the porous annulus 14, flows therethrough to form an annular ring of shroud gas around the upper surface 11A of the block or head 11. At this point, a combustible mixture of flammable gas is introducted to the enclosed area 24 formed by the septum 13 in communicating relationship to the hemispherical head 11. The gaseous mixture flows through the latter porous block 11 to the upper surface 11A thereof and is ignited to produce the flame under study. The cited shroud of inert gas passes through the porous annulus 14 forming an annular boundary around the flame produced by the combustible mixture on the upper surface 11A of the head or block 11.

After a stable flame has been achieved, a laser beam is introduced to the desired zone of the flame, and readings are taken for the temperature and make-up of the contents of the flame.

The research burner of this invention provides a stable flame of gas with extremely wide flame speed range at the upper surface 11A of the block 11. It compares with the stable flame of the conventional devices but with the ability to prove the same flame zone of the double-knife edge burner of the art. It also provides for an inert gas shroud around the flame to minimize the effects of entrained air on the flame properties. This is no propensity to flash-back under high flame speed conditions as there encountered with the double-knife edge burners of the art. The research burner offers the use of a porous metal burner with the capability of optical access to early flame regions without any disadvantage.

In use, a 3507.42 Å line of a $Kr^+$ laser was used to measure temperture and species concentration profiles of $N_2$, $O_2$, and NO on a lean (O=0.47) $H_2/N_2$ flame. With the present burner, a researcher can come within a laser beam diameter (0.1 mm.) of the burner surface. The spectral range of the detection system with a Reticon detector allows simultaneous observation of the three species of interest. Raman Q-branch signals were sufficiently large for NO, $O_2$and $N_2$ to allow a determination of temperature as well as the concentration for all three species. The experimental procedure utilized can be found in Vol 2, p 551 of the proceeding of the "First International Specialists Meeting of the Combustion Institute, Bordeaux, France. The only modification to the latter procedure was the use of a Reticon detector, and the present burner of this invention.

The foregoing disclosure and drawing are merely illustrative of the principles of this invention and are not to be interpreted in a limiting sense. I wish it to be understood that I do not desire to be limited to the exact details of construction shown and described because obvious modifications will occur to a person skilled in the art.

What is claimed is:

1. A research burner providing stable flames of flammable gas mixtures with optical access to the primary reaction zone of said flame consisting of:

a metallic base;

an inner annular hollow stainless steel septum having two ends of open construction one of which is secured to said base;

a porous water-cooled bronze hemispherical head having a curved upper surface for optical access secured to the other of said end of said septum;

said head containing a coil of copper tubing having an inlet and outlet for the passage of water, said base having a first port communicating with said head, said first port for passage of a gaseous flammable mixture;

an outer stainless steel annular shell of open construction secured to said base in spaced relation to said septum; and a porous bronze annulus mounted between said septum and said shell, said base having a second port communicating with said annulus for passage of a shroud gas selected from the group consisting of argon, nitrogen, and helium.

* * * * *